United States Patent

Moireau et al.

[11] Patent Number: 5,972,504
[45] Date of Patent: Oct. 26, 1999

[54] METHOD OF MANUFACTURING A COMPOSITE MATERIAL AND THE RESULTING MATERIAL

[75] Inventors: Patrick Moireau, Curienne; Timothy Johnson, Vimines, both of France

[73] Assignee: Vetrotex France, Chambery, France

[21] Appl. No.: 09/086,517

[22] Filed: May 28, 1998

Related U.S. Application Data

[62] Division of application No. 08/855,527, May 13, 1997, Pat. No. 5,789,074, which is a continuation of application No. 08/354,814, Dec. 8, 1994, abandoned.

[30] Foreign Application Priority Data

Dec. 9, 1993 [FR] France .................................. 93 14794

[51] Int. Cl.⁶ ...................................................... D02G 3/00
[52] U.S. Cl. ...................... 428/378; 428/221; 428/297.4; 428/298.7; 428/299.4; 428/357; 428/361; 428/364; 428/391; 428/392; 428/394
[58] Field of Search ..................................... 428/357, 361, 428/364, 378, 391, 392, 394, 299.4, 297.4, 298.7, 221

[56] References Cited

U.S. PATENT DOCUMENTS

| | | |
|---|---|---|
| 3,853,605 | 12/1974 | Fahey . |
| 3,935,344 | 1/1976 | Haggerty et al. . |
| 4,038,243 | 7/1977 | Maaghul . |
| 4,530,860 | 7/1985 | Johnson . |
| 4,752,527 | 6/1988 | Sanzero et al. . |
| 5,049,407 | 9/1991 | Soszka et al. . |
| 5,091,436 | 2/1992 | Frisch et al. . |
| 5,171,634 | 12/1992 | Soszka et al. ......................... 428/376 |
| 5,219,656 | 6/1993 | Klett et al. . |
| 5,272,195 | 12/1993 | Hagenson et al. . |
| 5,352,392 | 10/1994 | Johnson et al. . |
| 5,611,836 | 3/1997 | Moireau ................................. 65/453 |
| 5,698,000 | 12/1997 | Moireau et al. ....................... 65/453 |

FOREIGN PATENT DOCUMENTS

| | | |
|---|---|---|
| 436 198 | 7/1991 | European Pat. Off. . |
| 1087904 | 10/1967 | United Kingdom . |

*Primary Examiner*—Helen L. Pezzuto
*Attorney, Agent, or Firm*—Oblon, Spivak, McClelland, Maier & Neustadt, P.C.

[57] ABSTRACT

The invention relates to a method of manufacturing a composite material formed by an organic substrate reinforced by glass strands. The invention consists of the combination of an organic substrate and glass strands coated with a sizing composition constituted by a solution with a solvent content of less than 5% by weight, the said solution comprising a mixture of components which can be polymerized and/or cross-linked by heat treatment, amongst the said components, at least 60% being components with molecular weights (Mw) of less than 750, and from 0 to 25% by weight being coupling agents, lubricating agents, stabilizing agents, polymerization initiators and/or catalysts, the said agents and initiators optionally being capable of being polymerized and/or cross-linked, the said sizing composition being non-polymerized, and of the subsequent subjection of the assembly to heat treatment and/or to the action of actinic radiation.

19 Claims, No Drawings

METHOD OF MANUFACTURING A COMPOSITE MATERIAL AND THE RESULTING MATERIAL

This application is a divisional of 08/855,527, filed on May 13, 1997, now U.S. Pat. No. 5,789,074 which is a continuation of 08/354,814, filed on Dec. 8, 1994, now abandoned.

BACKGROUND OF THE INVENTION

1. Field of the Invention

The invention relates to the combination of an organic substrate and glass strands coated with a sizing composition constituted by a solution with a solvent content of less than 5% by weight, the solution comprising a mixture of components which can be polymerized and/or cross-linked by heat treatment, amongst the said components, at least 60% being components with molecular weights (Mw) of less than 750, and from 0 to 25% by weight being coupling agents, lubricating agents, stabilizing agents, polymerization initiators and/or catalysts, the said agents and initiators optionally being capable of being polymerized and/or cross-linked, the said sizing composition being non-polymerized, and of the subsequent subjection of the assembly to heat treatment and/or to the action of actinic radiation.

2. Discussion of the Background

The present invention relates to a method of manufacturing a composite material formed by an organic substrate reinforced by glass strands.

The manufacture of a composite material of this general type has been the subject of very many publications, particularly patent applications or patents.

In general, glass strands are coated, during their manufacture, with a sizing composition, the composition of which depends upon the nature of the organic substrate to be reinforced thereby.

The sizing composition, which is deposited on the glass filaments before the latter are assembled into at least one strand, should possess certain characteristics and should confer various properties on the strand. In particular, the sizing composition should be stable and should retain a constant composition in spite of the shear forces constantly brought about within the sizing composition by the filaments which pass through it at speeds of the order of several tens of meters per second.

The sizing composition should then protect the filaments from abrasion caused by the inevitable friction of the strand on various surfaces. It should also ensure the integrity of the strand, that is, the bonding together of the filaments which make it up. This characteristic is important because it not only enables a strand to be extracted easily from a winding (a very common arrangement for glass strands) but also limits the number of filaments which rub directly against all of the devices for guiding the strand. When the strand is intended to reinforce an organic substrate, the sizing composition should also facilitate the wetting of the filaments which make up the strand, by the said substrate.

The achievements of good integrity and of a good capacity to be wetted by the organic substrate are generally incompatible. In general, the greater the integrity of the strand, the stronger is the bonding between the filaments and the more difficult it is for the organic substrate to penetrate the interior of the strand. This difficulty in impregnating a strand with the organic substrate is even more marked when the strand has been twisted and is used as a reinforcement in the form of a fabric.

Finally, when the glass strand is intended to reinforce organic substrates, the sizing composition deposited on the filaments should be chemically compatible with the substrates.

Almost all known sizing compositions are sizing compositions in an aqueous phase in the form of solutions, or much more often, in the form of suspensions or emulsions, in water.

Before they are combined with an organic substrate, the glass strands thus sized have to be dried to eliminate the water which becomes useless or even a nuisance. In order to do this, the windings are subjected to temperature cycles generally of between 110 and 150° C. for periods which may reach and exceed 16 hours. The quantity of water to be evaporated is large since it represents, on average, at least 10 to 15% by weight of the winding. This operation requires special installations and energy consumption, the cost of which increases production costs.

Moreover, the drying of the winding may sometimes detract from the quality of the strand when it causes uneven migration of the sizing components through the turns of the windings.

In order to mitigate these problems, it is known to dry the strand (U.S. Pat. No. 3,853,605) or the filaments (WO-92/05122) directly, before the formation of the winding.

The drying of the strands during the drawing step necessitates the installation of devices such as ovens beneath each die. Moreover, the effectiveness of this drying method is closely linked with the manufacturing conditions such as the quantity of water on the strand, the composition of the sizing composition, the drawing speed, the number of filaments and their diameter. etc.

In rare cases of sizing compositions composed solely of organic constituents, the glass strands coated with such sizing compositions are often subjected to a special treatment before they are reeled on a rotating support. The purpose of this treatment is to bring about a modification of the sizing composition on the strand before it is reeled, such that the sizing composition does not give rise to excessive bonding of the turns of the winding to one another, which bonding can make the strand difficult if not impossible to unwind. This treatment consists, for example, of heating of the layer of filaments coated with the sizing composition so as to eliminate the solvent from the said sizing composition before the strand is formed by the assembly of the said filaments (U.S. Pat. No. 3,425,862) or polymerization of the sizing composition by the subjection of the strand to the action of ultra-violet radiation (U.S. Pat. No. 5,049,407) over at least a portion of its path. Here again, this type of treatment necessitates the installation of devices beneath each die and does not avoid the search for the best possible compromise between the integrity of the strand and its capacity to be wetted by an organic substrate.

An integral strand coated with a purely organic sizing composition can be produced without having been subjected to heat or other treatment; it is the sizing composition itself which bonds the filaments together. The patent U.S. Pat. No. 4,530,860 describes sizing compositions of this type which comprise a large percentage of film-forming agents, the essential role of which is to confer the integrity necessary for the handling of the strand.

The mechanical characteristics of a composite material formed by an organic substrate reinforced by glass strands depend upon the quality of the adhesion of the strands to the substrate. This adhesion results from the capacity of the strands to be wetted by the substrate which depends, in particular, upon the nature of the sizing composition, upon its distribution on the strand, and upon the condition under which the sizing composition has to bring about the cohesion of the filaments forming the strand. Now, these different variables are closely linked to the aforementioned conditions of manufacture of the strand, which impede the production of a strand with the best possible impregnation by an organic substrate.

SUMMARY OF THE INVENTION

The object of the present invention is to provide a method of manufacturing a composite material formed by an organic substrate reinforced by glass strands, the surfaces of which have been treated directly during their manufacture in order to confer on them characteristics favoring their impregnation by the said substrate.

A further object of the present invention is to provide a method of manufacturing a composition material which enables one or more of these mechanical properties to be improved.

These objects are achieved by a method which consists of the use of glass strands coated with a sizing composition constituted by a solution with a solvent content of less than 5% by weight, the solution comprising a mixture of components which can be polymerized and/or cross-linked by heat treatment, amongst the said components, at least 60% by weight being components with molecular weights (Mw) of less than about 750, less than 10% by weight being film-forming agents, and from 0 to 25% by weight being coupling agents, lubricating agents, stabilizing agents, and thermal polymerization initiators or catalysts, the agents and initiators optionally being capable of being polymerized and/or cross-linked by heat treatment, of the combination of the said glass strands, coated with the non-polymerized sizing composition, and an organic substrate, and of the subsequent subjection of the combination of glass strands and organic substrate to heat treatment and/or to the action of actinic radiation.

DETAILED DESCRIPTION OF THE PREFERRED EMBODIMENTS

According to the present invention, sizing composition means the mixture (in this case, the solution) which is deposited on the surface of the continuous glass filaments at the moment when they are produced by the mechanical drawing of molten glass threads emerging from a die. These filaments are assembled into at least one strand in the course of this operation.

Whereas, in the prior art, it was often necessary to eliminate the sizing composition deposited on the strand before proceeding with a second treatment to make it suitable for a particular application, one of the advantages of the present invention is the use of a strand which has undergone no treatment other than the deposition of a solution on its surface during its manufacture.

In the solution thus deposited, at least 60% of the mixture of components which can be polymerized and/or cross-linked is preferably constituted by components with molecular weights (Mw) of less than 500.

The components forming at least 60% of the mixture are preferably monomers.

The use of a mixture of monomers, which are generally quite reactive, favors the polymerization phenomenon.

Moreover, the use of a mixture of monomers facilitates the diffusion of a portion of the sizing composition into the matrix to be reinforced and favors the development of cross-linking which confers good stability on the polymer produced.

The sizing composition deposited on the filaments should have a minimum content of components which can be polymerized and/or cross-linked; this content is preferably at least 70% by weight. The sizing composition deposited on the filaments within the scope of the method according to the invention generally comprises from 75 to 100% by weight of components which can be polymerized and/or cross-linked.

In most cases, the sizing composition deposited on the filaments is free of solvent. It may sometimes comprise a small quantity thereof; in this case the solvents are organic solvents which are sometimes necessary to dissolve certain components which can be polymerized and/or cross-linked, or water which, in most cases, is introduced indirectly by means of hydrated or hydrolysed constituents. The presence of these solvents in limited quantity does not require special treatments for their elimination.

The sizing composition deposited on the filaments is also characterized by the optional presence of small quantities of film-forming agents. The content of the latter, which is less than 10% by weight, is insufficient for them to play the conventional part of bonding agents or to confer any integrity on the strand. This content is most often less than 5% by weight. On the other hand, in small quantities, they can facilitate drawing for certain drawing speeds, and for certain diameters of the filaments drawn. Thus, when the filaments are very fine and the drawing speeds are high, the presence of film-forming agents attenuates the friction of the filaments on the device which deposits the sizing composition. The film-forming agents used within the scope of the invention are preferably silicone and/or siloxane derivatives.

The sizing composition deposited on the filaments may also comprise coupling agents such as organo-silanes; in this case, the silane content in the sizing composition may reach 15% by weight of the said sizing composition. These coupling agents are not indispensable within the scope of the invention.

The sizing composition deposited on the filaments may also comprise lubricating agents; these agents are introduced into the sizing composition particularly when the strand thus sized is intended for certain textile applications. These agents are preferably fatty esters or glycol esters. Their content by weight preferably does not exceed 8%; in excess of 8%, when the sized strand is in contact with an organic substrate, these lubricating agents may migrate within the substrate and there is a risk that they may then act as oxidation or hydrolysis catalysts. This phenomenon results in accelerated aging of the composite material produced or may give rise to a bonding defect.

According to the intended purpose of the strand produced according to the invention, the sizing composition may optionally comprise thermal polymerization initiators and/or catalysts in quite large proportions. A large content of polymerization initiators and/or catalysts may detract from the stability of the sizing composition; for this reason, in the absence of stabilizing agents which act as polymerization retarders, this content does generally not exceed 4% by weight.

As indicated above, the sizing composition may comprise stabilizing agents which act as polymerization retarders. These agents are introduced into the sizing composition particularly when it is necessary to prevent certain constituents from reacting with one another spontaneously during the drawing step. In general, their content in the sizing composition deposited on the filaments does not exceed 3% by weight.

The sizing composition deposited on the filaments is distributed very rapidly over their entire surface and forms a true protective film for each one. At the stage at which the winding has just been manufactured, the strand which forms it is constituted by filaments which may be able to slide relative to one another, or move apart. The strand produced according to the invention does not have integrity in the ordinary sense of the term, that is to say, it is not constituted by filaments which are fixed together by virtue of bonding by adhesion brought about by one or more film-forming constituents of the sizing composition.

In spite of this arrangement, the strand according to the invention is easily extracted from its winding without the need for preliminary treatment which can polymerize the sizing composition, as is the case with a strand coated with a sizing composition with a relatively high content of film-forming agents. This lack of integrity of the strand, in the conventional sense of the term, is important to the extent that it favors impregnation by the organic substrate with which it will subsequently be combined.

Depending on the part to be played by the strand in the process of the polymerization of the organic substrate, it will be coated with a sizing composition which may or may not comprise one or more thermal polymerization initiators and/or catalysts.

Thus, according to the invention, it is possible to produce a composite material by combining a strand coated with a sizing composition which is free of polymerization initiator and/or catalyst and an organic substrate comprising at least one polymerization initiator and/or catalyst and/or a copolymerization agent.

It is also possible to combine an organic substrate and a strand coated with a sizing composition, the former comprising at least one polymerization initiator and/or catalyst and the latter comprising at least one polymerization initiator and/or catalyst.

In this case, the sizing composition may sometimes change over time. To prevent this phenomenon, it is then preferable to use a strand, the sizing composition of which also comprises a stabilizing agent.

Having generally described this invention, a further understanding can be obtained by reference to certain specific examples which are provided herein for purposes of illustration only and are not intended to be limiting unless otherwise specified.

The glass strands described below were formed by the mechanical drawing of thin streams of molten glass flowing from the holes in a die, according to a method well known to an expert in the art. The glass used was an aluminoborosilicate, practically free of alkaline oxides, known by the name of E glass.

The filaments produced, which were of 14 micrometers diameter, were coated with a sizing composition according to the invention by means of a sizing roller of 40 millimeters diameter rotating at 110 revolutions per minutes.

EXAMPLE 1

In this example, the sizing composition deposited on the filaments had the following composition by weight:

| Components with molecular weights of less than 750 (monomers): | |
| --- | --- |
| 2(2-ethoxy ethoxy) ethylacrylate marketed under the reference "SR 256" by the CRAY VALLEY company | 22% |
| triethylene glycol divinyl ether marketed under the reference "DVE 3" by the company INTERNATIONAL SPECIALITY PRODUCTS | 24% |
| ethoxylated trimethylolpropane triacrylate marketed under the reference "SR 454" by the CRAY VALLEY company | 20% |
| Component with a molecular weight greater than 750: | |
| acrylate resin on an aromatic epoxy base product marketed under the reference "PHOTOMER 3016" by the AKCROS company | 20% |
| Coupling Agent: | |
| aminopropyltriethoxysilane product marketed under the reference "A 1100" by the company OSI SPECIALITIES S.A. | 10% |
| Lubricating agent: | |
| isopropyl palmitate | 4% |

This sizing composition was deposited at the viscosity of about 40 cP at an average temperature of 37° C.

EXAMPLE 2

Whereas the sizing composition deposited on the filaments in this example comprised the same constituents as the sizing composition of the previous example, but sometimes in slightly different proportions, it also comprised a thermal polymerization initiator. Its composition by weight was as follows:

| Monomers: | |
| --- | --- |
| "SR 256" | 21% |
| "DVE 3" | 23% |
| "SR 454" | 20% |
| Polymer: "PHOTOMER 3016" | 20% |
| Coupling Agent: silane "A 1100" | 10% |
| Lubricating agent: isopropyl palmitate | 4% |
| Initiator: terbutyl peroxybenzoate product marketed under the reference "TRIGONOX C" by the AKZO company | 2% |

The sizing composition was deposited at a viscosity of about 50 cP at a temperature of the order of 25° C.

Within the scope of the tests corresponding to the foregoing examples, almost identical windings were produced after a reeling time of 20 minutes.

The strands could easily be removed from the various windings formed. The strands extracted from a winding formed within the scope of Example 1 had an average thickness of 321 tex, their ignition loss rising to 0.80%. The strands extracted from a winding formed within the scope of Example 2 had an average thickness of 330 tex, their ignition loss rising to 0.75%.

In order to demonstrate the advantage of reinforcing organic substrates in accordance with the invention, the winding of strands coated with a sizing composition corresponding to Example 2 were treated thermally, during which treatment, they were subjected to a temperature of 130° C. for about 180 minutes. The polymerization of the sizing composition thus produced conferred on these strands an integrity not possessed by the coated strands of Example 1. Since these sizing compositions of the two examples were very closely related, the essential difference between the two types of strands before their combination with an organic substrate lay in the integrity in one case and the lack of integrity in the other case.

Plaques with parallel strands were formed from these strands in accordance with the strand NF 57152. The resin used was CY205 epoxy resin marketed under this reference by the company CIBA GEIGY, to which 21.5% by weight of an aminated hardener serving as a copolymerization agent, also marketed by the company CIBA GEIGY under the reference HT 972, was added.

The mechanical bending and shear characteristics of the plaques were measured according to the standards ISO 178 and ISO 4585, respectively. These characteristics were measured before aging and after the immersion of the plates in water at 98° C. for 72 hours. These characteristics are compared below with those of plates with parallel strands formed with a strand coated with an aqueous sizing composition comprising an emulsion of epoxy resin, silanes and cationic surfactants and dried under normal conditions.

The results obtained, over 8 to 10 samples for each type of strand, with reference to plates having identical quantities of glass by weight, were as follows:

|  | Ex. 1 | Ex. 2 | Reference |
|---|---|---|---|
| Bending stress at breaking point (MPa) | | | |
| before aging | 2488 | 2376 | 2280 |
| σ (MPa) | 47 | 75 | 40 |
| after aging | 1637 | 1563 | 1400 |
| σ (MPa) | 27 | 73 | 20 |
| Shear stress at breaking point (MPa) | | | |
| before aging | 74.5 | 64.0 | 69.5 |
| σ (MPa) | 1.0 | 1.4 | 1.0 |
| after aging | 50.4 | 32.2 | 40.0 |
| σ (MPa) | 1.1 | 1.0 | 0.4 |

These results show that composite specimens produced according to the invention had characteristics better than those of the specimens produced from a strand coated with an almost identical sizing composition but polymerized; these characteristics differed notably from those of the composite specimens produced from a strand of known type.

In the foregoing examples, the composite material was produced by the polymerization of the organic substrate by means of heat treatment (see standard NF 57152).

A composite material according to the invention may also be manufactured by subjecting the organic substrate and the strand coated with the non-polymerized sizing composition to the action of actinic radiation. Actinic radiation means radiation which can penetrate the core of the material, such as gamma- or x-rays of an electron beam.

Obviously, numerous modifications and variations of the present invention are possible in light of the above teachings. It is therefore to be understood that within the scope of the appended claims, the invention may be practiced otherwise than as specifically described herein.

This application is based on FR 93/14794, filed in France on Dec. 9, 1993, the entire contents of which are hereby incorporated by reference.

What is claimed as new and desired to be secured by Letters Patent of the United States is:

1. Glass strands constituted by filaments capable of sliding relative to one another or move apart, said filaments being coated with a sizing composition constituted by a solution with a solvent content of less than 5% by weight, wherein said solution comprises at least 60% by weight of components with molecular weight (Mw) of less than about 750, less than 10% by weight being film-forming agents, and from 0 to 25% by weight of at least one additive selected from the group consisting of a coupling agent, a lubricating agent, a stabilizing agent, and a thermal polymerization initiator, a catalyst and a mixture thereof, wherein said components can be polymerized and/or cross-linked by heat treatment and wherein, said agents and initiators are optionally capable of being polymerized and/or cross-linked by heat treatment.

2. Glass strands constituted by filaments capable of sliding relative to one another or move apart, said filaments being coated with a non-polymerized sizing composition constituted by a solution with a solvent content of less than 5% by weight, wherein said solution comprises at least 60% by weight of acrylic and/or vinyl ether components with molecular weight (Mw) of less than about 500, wherein at least 43% by weight of these components are polyfunctional components, less than 10% by weight being film-forming agents, and from 0 to 25% by weight of at least one additive selected from the group consisting of a coupling agent, a lubricating agent, a stabilizing agent, a thermal polymerization initiator, a catalyst and a mixture thereof, wherein said components can be polymerized and/or cross-linked by heat treatment and wherein said agents and initiators are optionally capable of being polymerized and/or cross-linked by heat treatment.

3. The glass strands of claim 2, wherein said sizing composition is free of polymerization initiator, catalyst or both.

4. The glass strands of claim 2, wherein said sizing composition comprises at least one member selected from the group consisting of a polymerization initiator, a catalyst and a mixture thereof.

5. The glass strands of claim 2, wherein said non-polymerized sizing composition contains no organosilane coupling agent.

6. The glass strands of claim 2, wherein at least 60% by weight of said sizing composition is constituted by monomers.

7. The glass strands of claim 2, wherein at least 70% of said sizing composition consists of compounds which can be polymerized, cross-linked or both.

8. The glass strands of claim 7, wherein between 75 and 100% of said sizing composition consists of compounds which can be polymerized, cross-linked or both.

9. The glass strands of claim 2, wherein said sizing composition is without solvent.

10. The glass strands of claim 2, wherein said sizing composition further comprises up to 5% by weight of a film-forming siloxane.

11. The glass strands of claim 2, wherein said sizing composition further comprises up to 15% by weight of an organosilane coupling agent.

12. The glass strands of claim 2, wherein said sizing composition further comprises up to 8% by weight of a lubricating agent.

13. The glass strands of claim 2, wherein said sizing composition further comprises up to 4% by weight of a polymerization initiator.

14. The glass strands of claim 2, wherein said sizing composition further comprises up to 3% by weight of a stabilizing agent.

15. The glass strands of claim 2, wherein said sizing composition is free of polymerization initiator, catalyst or both.

16. The glass strands of claim 2, wherein said sizing composition comprises at least one member selected from the group consisting of a polymerization initiator, a catalyst and a mixture thereof.

17. The glass strands of claim 16, wherein said sizing composition further comprises a stabilizing agent.

18. The glass strands of claim 12, wherein said lubricating agent is selected from the group consisting of a fatty ester, a glycol ester and a mixture thereof.

19. The glass strands of claim 2, wherein said acrylic and/or vinyl ether components are 2(2-ethoxy ethoxy) ethylacrylate, triethylene glycol divinyl ether and/or ethoxylated trimethylol propane triacrylate.

* * * * *